(12) United States Patent
DeForest, Jr.

(10) Patent No.: US 7,429,055 B2
(45) Date of Patent: Sep. 30, 2008

(54) CYCLING DEVICE

(76) Inventor: D. Curtis DeForest, Jr., 19 Highwood, East Hampton, NY (US) 11937

( * ) Notice: Subject to any disclaimer, the term of this patent is extended or adjusted under 35 U.S.C. 154(b) by 176 days.

(21) Appl. No.: 11/264,638

(22) Filed: Nov. 1, 2005

(65) Prior Publication Data

US 2006/0163838 A1 Jul. 27, 2006

Related U.S. Application Data

(60) Provisional application No. 60/624,031, filed on Nov. 1, 2004.

(51) Int. Cl.
*B62K 23/02* (2006.01)
*B62K 23/08* (2006.01)
(52) U.S. Cl. .............. 280/282; 280/261.1; 280/286; 280/290
(58) Field of Classification Search ........... 280/282, 280/281.1, 286, 290
See application file for complete search history.

(56) References Cited

U.S. PATENT DOCUMENTS

| 90,546 | A | 5/1869 | Huntington |
| 366,690 | A | 7/1887 | Schoening |
| 389,855 | A | 9/1888 | Rombauer |
| 396,854 | A | 1/1889 | Bowen |
| 601,107 | A | 3/1898 | Simpier |
| 673,861 | A | 5/1901 | Cummings |
| 3,183,020 | A | 5/1965 | Hawver |
| 4,152,005 | A * | 5/1979 | Vanore ............... 280/234 |
| 4,192,395 | A | 3/1980 | Barber |
| 4,456,277 | A * | 6/1984 | Carpenter ............ 280/282 |
| 4,655,470 | A | 4/1987 | Lin |
| 5,544,906 | A * | 8/1996 | Clapper ............ 280/288.1 |
| 5,769,441 | A | 6/1998 | Namngani |
| 6,203,043 | B1 * | 3/2001 | Lehman ............ 280/288.1 |
| 6,572,129 | B1 * | 6/2003 | Bean ................. 280/234 |
| D478,846 | S * | 8/2003 | Sauter ............... D12/107 |
| 7,017,685 | B2 * | 3/2006 | Schoenberg ........... 180/2.1 |
| 7,077,415 | B2 * | 7/2006 | Ikeda et al. ........... 280/246 |
| 7,293,623 | B2 * | 11/2007 | Berkelmans .......... 180/205 |

* cited by examiner

*Primary Examiner*—Lesley D. Morris
*Assistant Examiner*—Marlon Arce-Diaz
(74) *Attorney, Agent, or Firm*—Collard & Roe, P.C.

(57) ABSTRACT

A cycling device comprising a frame a plurality of pedals a plurality of wheels coupled to said frame, and a harness coupled to said frame wherein the harness allows a user to be coupled to said frame. In this case there can be for example, two driven wheels which are driven by the pedals and a non-driven guide wheel as well.

18 Claims, 7 Drawing Sheets

FIG. 7A
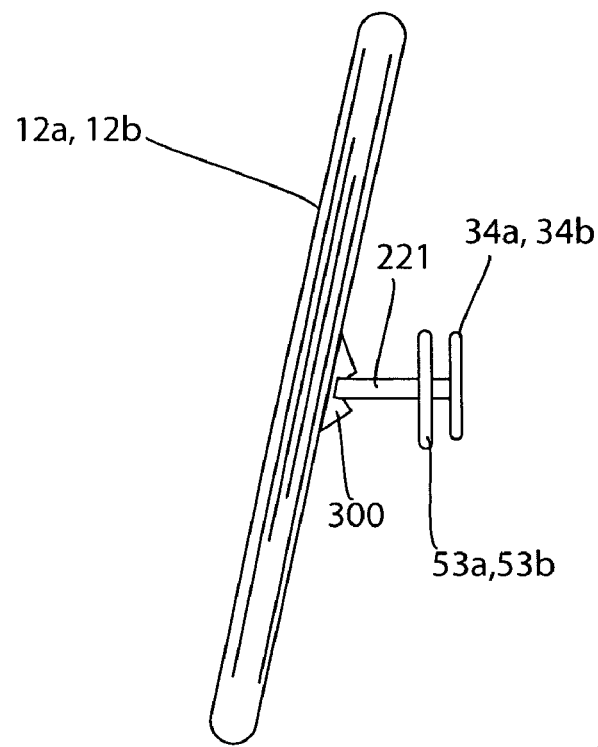
FIG. 7B
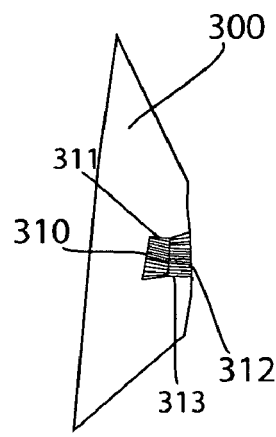
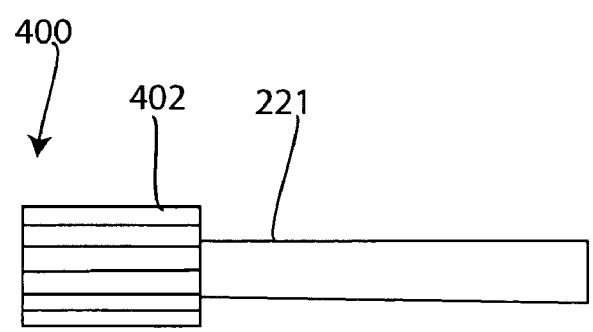
FIG. 7C

CYCLING DEVICE

CROSS REFERENCE TO RELATED APPLICATIONS

Applicant claims priority under 35 U.S.C. §119e of U.S. Provisional Application No. 60/624,031 filed Nov. 1, 2004.

BACKGROUND OF THE INVENTION

The present invention relates to a bicycle which can be used by a user wherein that user uses his or her full body. With the design of this invention, there is a frame, a set of wheels a plurality of pedals and a harness allowing a user to be freely suspended from the frame so that the user can use the pedals. Other types of cycling devices are known in the art. For example, the following U.S. Patents may generally relate to this field: U.S. Pat. No. 4,655,470 to Lin; U.S. Pat. No. 3,183,020 to Hawver; U.S. Pat. No. 673,861 to Cummings; U.S. Pat. No. 601,107 to Simpier; U.S. Pat. No. 5,769,441 to Namnagani; U.S. Pat. No. 396,854 to Bowen; U.S. Pat. No. 389,855 to Rombauer; U.S. Pat. No. 90,456 to Huntington; U.S. Pat. No. 4,192,395 to Barber; and U.S. Pat. No. 366,690 to Schoening wherein the disclosures of these patents are hereby incorporated herein by reference.

SUMMARY OF THE INVENTION

In one embodiment there can be a cycling device comprising a frame a plurality of pedals a plurality of wheels coupled to the frame, and a harness coupled to the frame wherein the harness allows a user to be coupled to the frame. There can be for example, two driven wheels which are driven by the pedals and a non-driven floater, support or guide wheel as well. This floater wheel can be lifted off of the ground to allow a user to turn more quickly.

The harness is essentially optional and can be replaced by a chair or any other type of support device known in the art. This harness can be secured to the frame, such as to a "sissy bar" which provides a head, neck and back support. Support for this harness can come from a cross support at the bottom behind the foot pedals.

The pedals can for example include two foot pedals and two hand pedals. These pedals can be synchronized such that at least one foot pedal moves or rotates in a synchronized manner with at least one hand pedal. To achieve this synchronization, there can be a linkage or chain that is coupled to a drive gear which is coupled to a foot pedal and wherein the chain is coupled to a drive gear which is coupled to a hand pedal. This chain can then also be coupled to a drive gear which is coupled to a driven wheel.

Alternatively, the chain can be coupled to either a foot pedal drive gear or a hand pedal drive gear. Then in an alternative embodiment, a synchronization shaft can be coupled to both the drive pedal and the drive gear either directly or indirectly so that the a hand pedal and a foot pedal are synchronized in motion. For example, the indirect connection can be through a connection of the synchronization shaft at one end to a foot pedal drive gear and at the opposite end to a hand pedal drive gear.

Alternatively, the indirect connection can be through a connection of the synchronization shaft at one end to a foot pedal drive shaft and at the other end to a hand pedal drive shaft.

For example, with one example of this synchronization, a user can use his or her weight to press down on a left foot pedal while pulling or pushing down on a left hand pedal. Conversely, a user can in an alternating motion push down on the right foot pedal while pulling or pushing down on the right hand pedal. The user then can obtain an alternating stroke based drive for the cycle device to continuously propel the user and the cycling device forward.

One of the benefits of this device is that it provides for the user an exercise and outdoor device that gives the user a feeling of free suspension in air while exercising. In addition, this device and its design provides for a stable device that is easily movable.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views:

FIG. 7A is a side view of another example of a connection between an axle and a wheel;

FIG. 7B shows a close up view of the axle connection on the wheel; and

FIG. 7C shows a close up view of the axle.

DETAILED DESCRIPTION OF PREFERRED EMBODIMENTS

Figure 1:
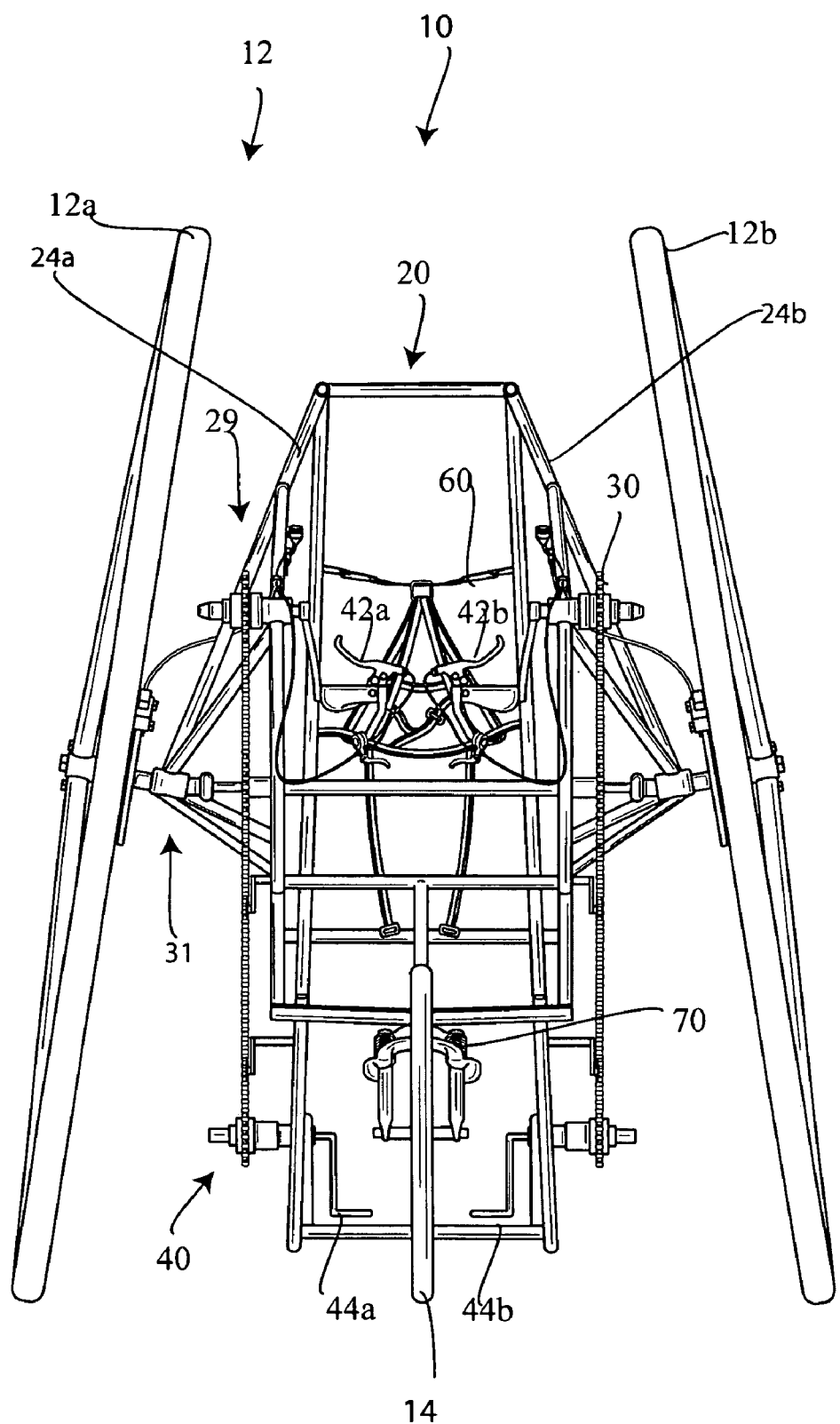
FIG. 1 is a front view of an example of an embodiment of the invention relating to a cycle.

Turning now in detail to the drawings, FIG. 1 shows a front view of an example of the invention for a first embodiment of the device 10. In this first embodiment there is shown a set of base wheels 12 which can include a first base wheel 12a and an additional base wheel 12b disposed opposite wheel 12a. There can also be an additional guide, support or floater wheel 14, which supports a third point when braking. Wheels 12 can be supported by a frame 20 and also be coupled to a drive system 29 which can include gearing 30 and pedals 40, wherein this gearing or drive system is coupled to or supported by frame 20. Pedals 40 can include a pedal 42a or an additional pedal 42b. There can also be other pedals such as pedals 44a, or pedals 44b which can also comprise pedals 40.

There can also be a braking or velocity control system 50 which can be in the form of brakes which may be coupled to drive element where the hand controls can be coupled to pedals 42a or 42b with the actual brakes being coupled to a one way bearing collar which allows each pedal to coast while disengaged from the drive.

There can also be a support device such as a harness 60 which can be used to support a user while using the device.

A suspension system 70 which can be in the form of shock absorbers can be disposed adjacent to front floater, support or guide wheel 14, wherein this suspension system will smooth braking by providing a third point in front of the user.

Figure 3:
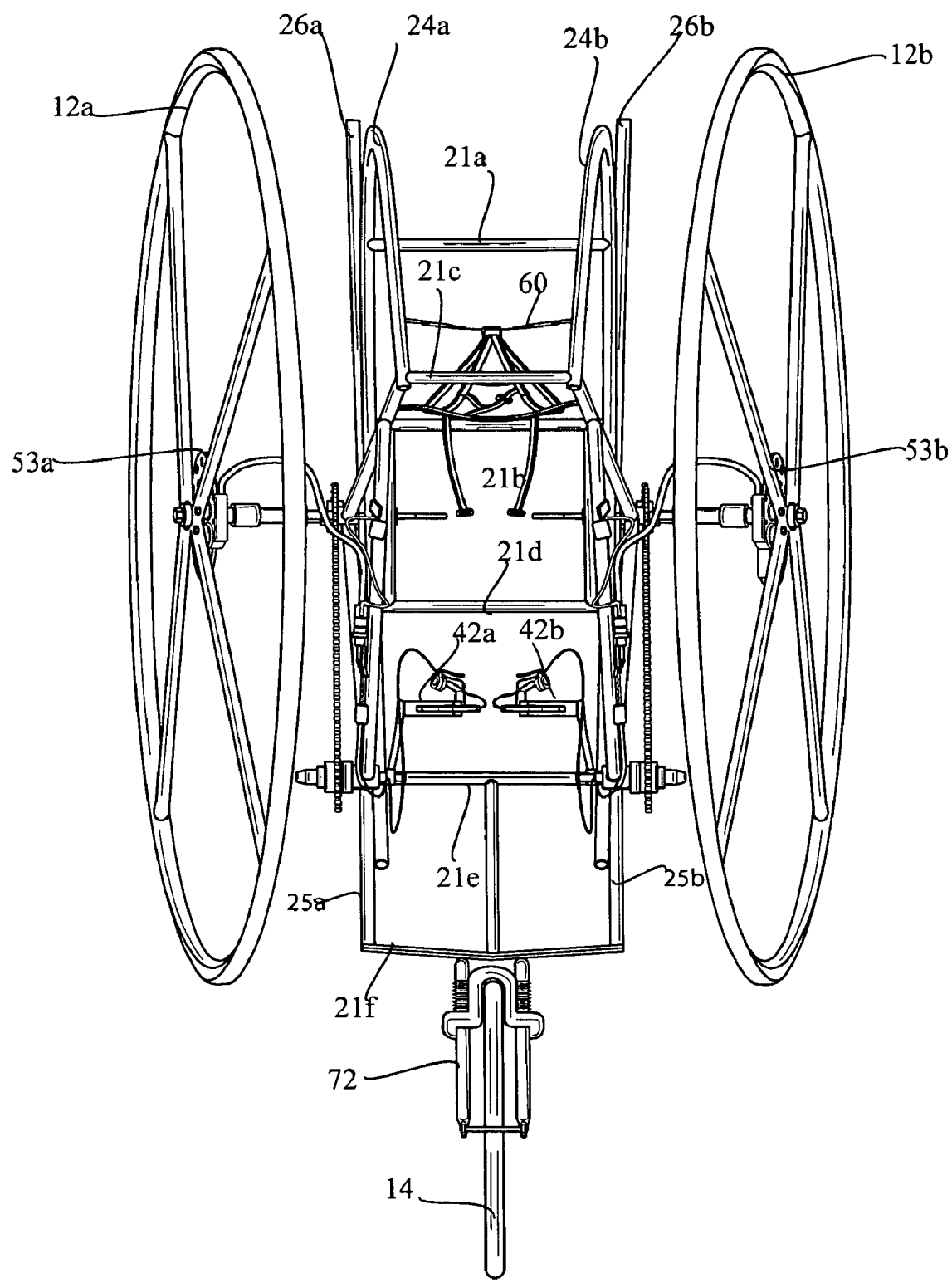
FIG. 3 is a side view of the embodiment shown in FIG. 1.
Figure 4:
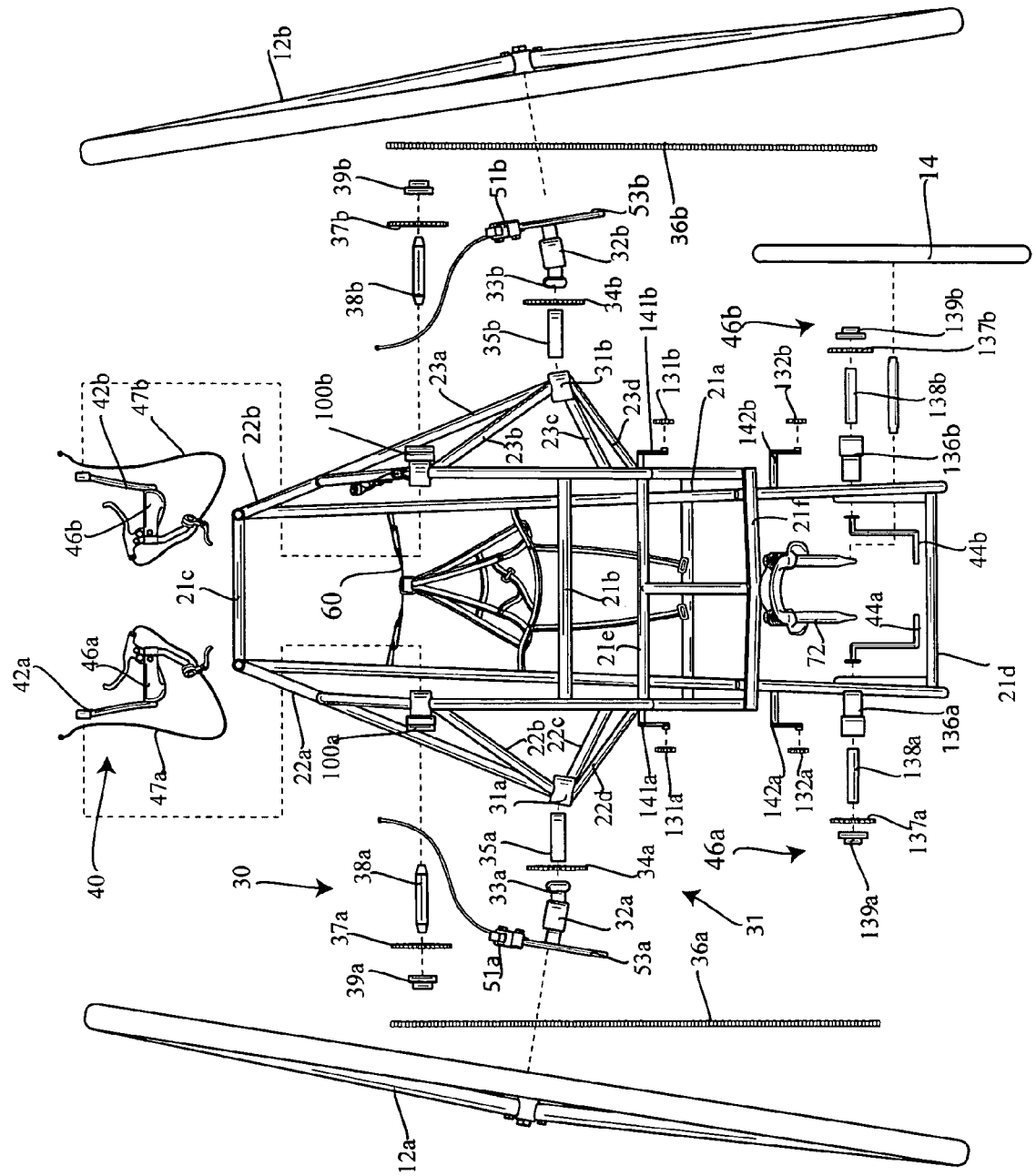
FIG. 4 is a top view of the embodiment shown in FIG. 1.

As shown in FIGS. 1, 3, and 4 wheels 12 can be coupled to frame 20 in a slanted manner wherein when the device is resting on a surface, a bottom region of the wheels are spaced apart from each other at a greater distance than a top region of these wheels. By angling these wheels, there can be a greater support at the base so that the device is less likely to turn over on its side.

Figure 2:
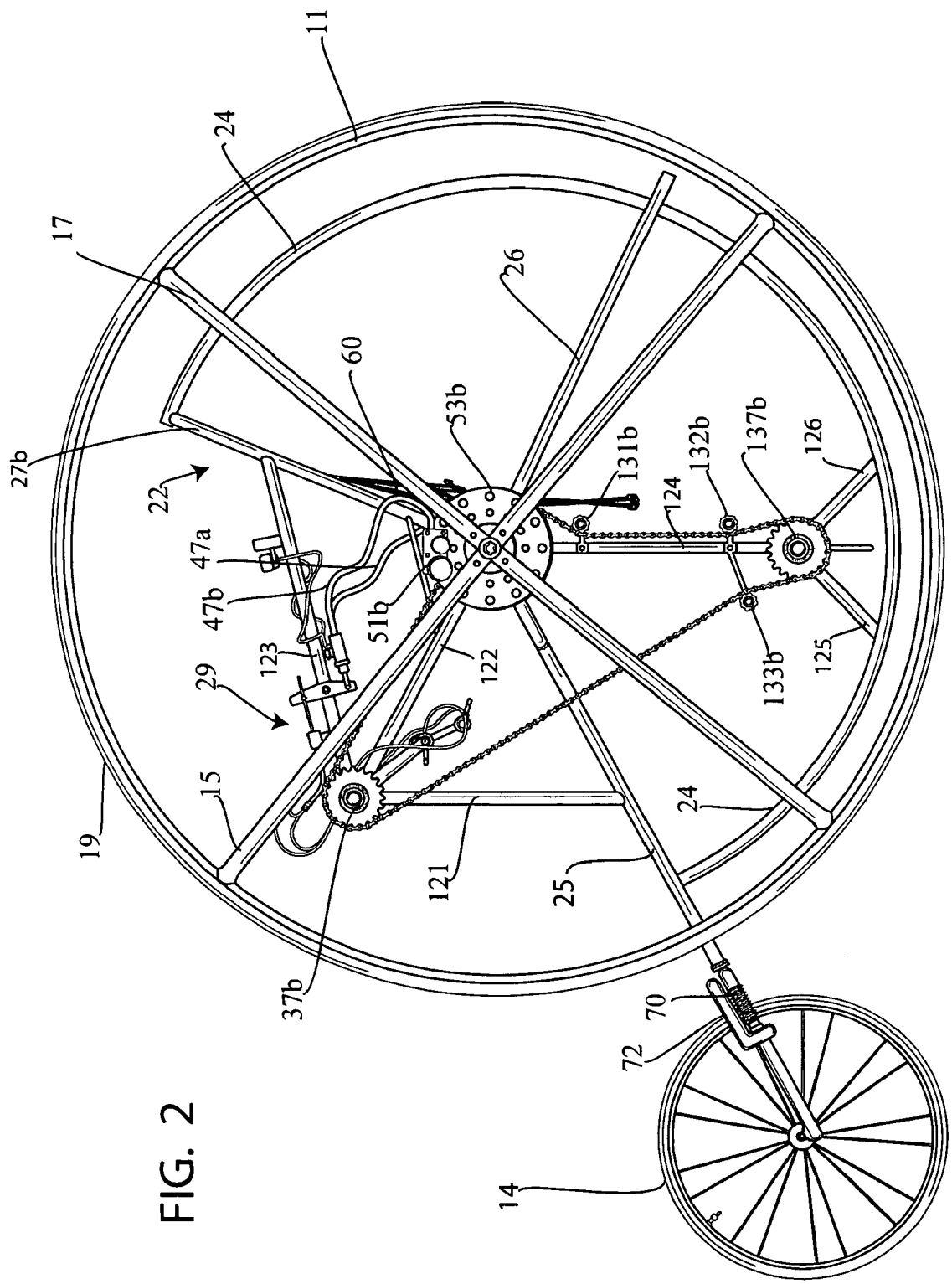
FIG. 2 is an exploded front view of the embodiment shown in FIG. 1.

These wheels 12a and 12b can be considerably larger than guide wheel 14 and act as driven wheels. Wheels 12a and 12b can be of a diameter wherein the center of gravity of the user is below the spin axis of the wheels. Wheels 12a and 12b are driven by drive system 29 which can include gears 30 and pedals 40. As shown in FIG. 2, each of these wheels can essentially include a round frame or rim 11 and also spokes or support bars 15 and 17 which can be used to support rim 11. A tire 19 extends around an outside region of these wheels.

Wheels 12a and 12b can be coupled to an axles 31a and 31b which forms part of the drive system 29 and which is coupled to a base rim 53a on one side and another base rim 53b (See FIGS. 3 and 4) on another side. These base rims can be used as a portion of a braking system which allows brakes 56a and 56b to respectively clamp down on respective rims 53a, and 53b.

To support these components frame 20 includes a plurality of different support elements or bars. For example, FIG. 3 which shows a top view, shows that frame 20 can include a plurality of spreader bars which can be used to keep each side of the frame spread apart from each other. For example, there are spreader bars 21a, 21b, 21c, 21d, 21e, and 21f which can be used to keep the different sides or parts spaced apart from each other. One set of bars 22a, 22b, 22c and 22d form a first side support frame for rotatable joint 31a and wheel 12a while another set of bars 23a, 23b, 23c, and 23d form a second side support frame for which can be used to support wheel 12b along with rotatable joint 31b which connects to wheel 12b. A set of curved support bars 24a and 24b can be used to provide support for a set of support bars 25a and 25b which extend out to a fork or frame 72 for wheel 14. In addition support bars 26a and 26b are used to support curved bars 24a and 24b in the frame and extend out from a center region and radiate out. Another set of bars 27a and 27b also extend out from a center region and are coupled to an end of curved support bars 24a and 24b respectively.

This frame 20 can also include a plurality of additional support bars which can be used to support the drive mechanism. These additional support bars can include three support bars 121, 122, and 123 which can be used to support sprockets 37a and 37b and also used to rotatably support pedals 42a and 42b. Additional support bars 124, 125 and 126 can be used to support sprockets 137a and 137b along with guide wheels 131, 132 which include guide wheels 131a and 131b and 132a and 132b and also guide wheel 133 or wheels 133a (not shown) or 133b) which can be used to guide a chain 36 through and around the sprockets.

There are at least two additional wheel support bars 25a and 25b which can be used to support additional floater wheel 14. In this case, additional wheel support bars 25a and 25b extend out from a central region and extend into fork 72 which can be used to floater support wheel 14.

Wheels 12 can be coupled to the frame via an axle such as axle 31. Axle 31 can include an angled extension 32, in the form of a first angled extension 32a on one side, and another angled extension on the other side. Coupled to the angled extension is a coupling 33a with an opposite coupling 33b disposed on the opposite side. Coupled to couplings 33a and 33b are associated sprockets 34a and 34b, which are in turn coupled to axle links 35a and 36a. These axle links are rotatably coupled to frame 20 in associated joints 31a and 31b.

There is also an additional sprocket and axle set relating to the drive element wherein there are sprockets 37a and 37b which are rotatably coupled to joints 31a and 31b via associated shafts 38a and 38b which can fit inside of a ball bearing or rotatable joint which is coupled to frame 20.

FIG. 4 shows an exploded front view of this device wherein this view shows pedals 40 including pedals 42a and 42b which are attachable via crank handles to a rotatable joint 100a and 100b respectively. Each of these pedals 42a and 42b include brakes 46a and 46b such as hand brakes with respective brake cables 47a and 47b coupled thereto. These cables are coupled to brake pads 51a and 51b respectively wherein by pressing down on brakes 46a and 46b this causes brake pads to press against either disc 53a or disc 53b to stop or control any one of wheels 12a or 12b from turning.

The drive mechanism or drive means 30 can include a set of different sprockets. A first set of sprockets 37a and 37b are coupled via respective axles 38a and 38b to rotatable joints 100a and 100b and are secured by respective nuts 39a and 39b on axles 38a and 38b. A second set of sprockets 34a and 34b are secured via axles 35a and 35b to rotatable joints 31a and 31b. In addition, another set of sprockets 137a and 137b are secured via their respective axles 138a and 138b to rotatable joints 136a and 136b. Furthermore, coupled to rotatable joints 136a and 136b are pedals 44a and 44b which can be used to turn sprockets 137a and 137b forming a drive.

In addition, sprockets 37a and 37b are driven by pedals 42a and 42b forming an additional drive as well.

Chains or linkage 36a and 36b can be coupled to these sprockets and be used to drive wheels 12a and 12b. Thus, as sprockets 37a and 37b are driven by pedals 42a and 42b or as sprockets 137a and 137b are driven by pedals 44a and 44b, this drives respective chains 36a and 36b which mesh with respective sprockets 34a and 34b to create drive in wheels 12a and 12b thus, these wheels can be considered driven wheels 12a and 12b.

Chains 36a and 36b may be guided between these sprockets via adjustable guides. Adjustable guides may include rotating sprocket guides and adjustable arms. For example, there is an adjustable arm 141a which holds chain guide 131a, an adjustable arm 141b which holds chain guide 131b, an adjustable arm 142a which holds guide 132a and an adjustable arm 142b which holds guide 132b. The adjustability can occur when these arms are rotated about a central connection point on frame 20 as shown in FIG. 2. This adjustability can then lead to a tightening of the chain to keep the proper tension in this chain.

Figure 5:
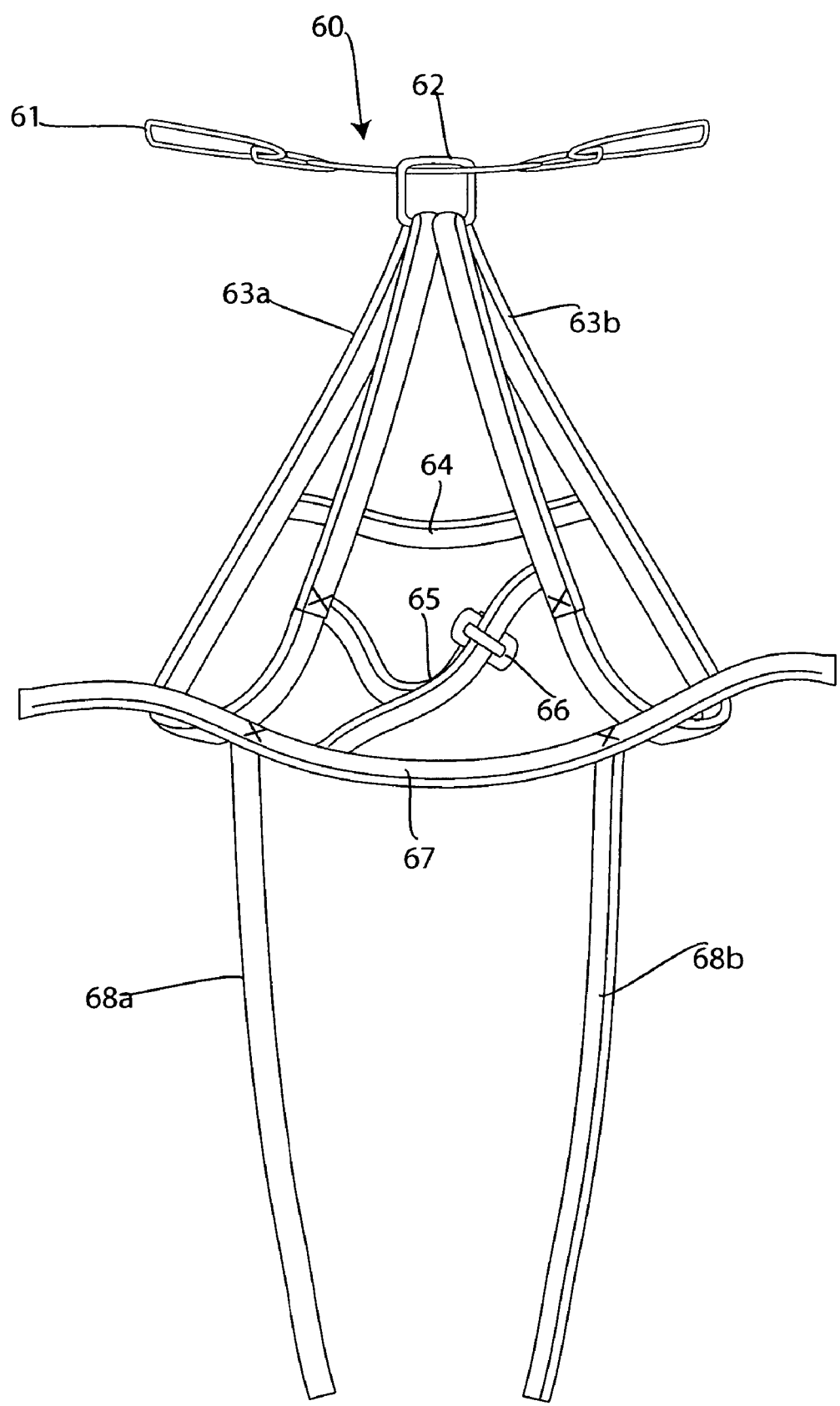
FIG. 5 is a front view of the harness.

FIG. 5 shows a front view of a harness 60 which can be coupled to a coupling strap 61 and which can be coupled to a sissy bar 60a to support a user's head, neck and back support. Harness can include a buckle or eyelet 62, a plurality of arm or shoulder straps 63a and 63b which allow a user to place his or her hands therethrough. There can also be a back strap 64 which extends across these two shoulder or arm straps 63a and 63b to keep them spaced apart at a particular distance. There can also be a front strap 65, which is adjustable via an adjuster 66 which can be used to control the distance or span of separation of shoulder straps 63a and 63b. A cross strap 67 can be used to couple together shoulder straps 63a and 63b and also leg or thigh straps 68a and 68b.

Arm or shoulder straps 63a and 63b can be set so that arms or shoulders of a person's body can extend out from holes formed between these straps. In addition, a person's body can fit between the distance spanned by straps 64 and 65 and also between straps 63a and 63b. Strap 67 which would connect at each end 67a and 67b to frame 20 would be positioned approximately adjacent to or below a person's waist, while straps 68a and 68b would be formed as loops which would allow a user to fit his or her legs therethrough to allow a user to be completely supported in this harness while still maintaining a relatively free range of motion.

Figure 6:
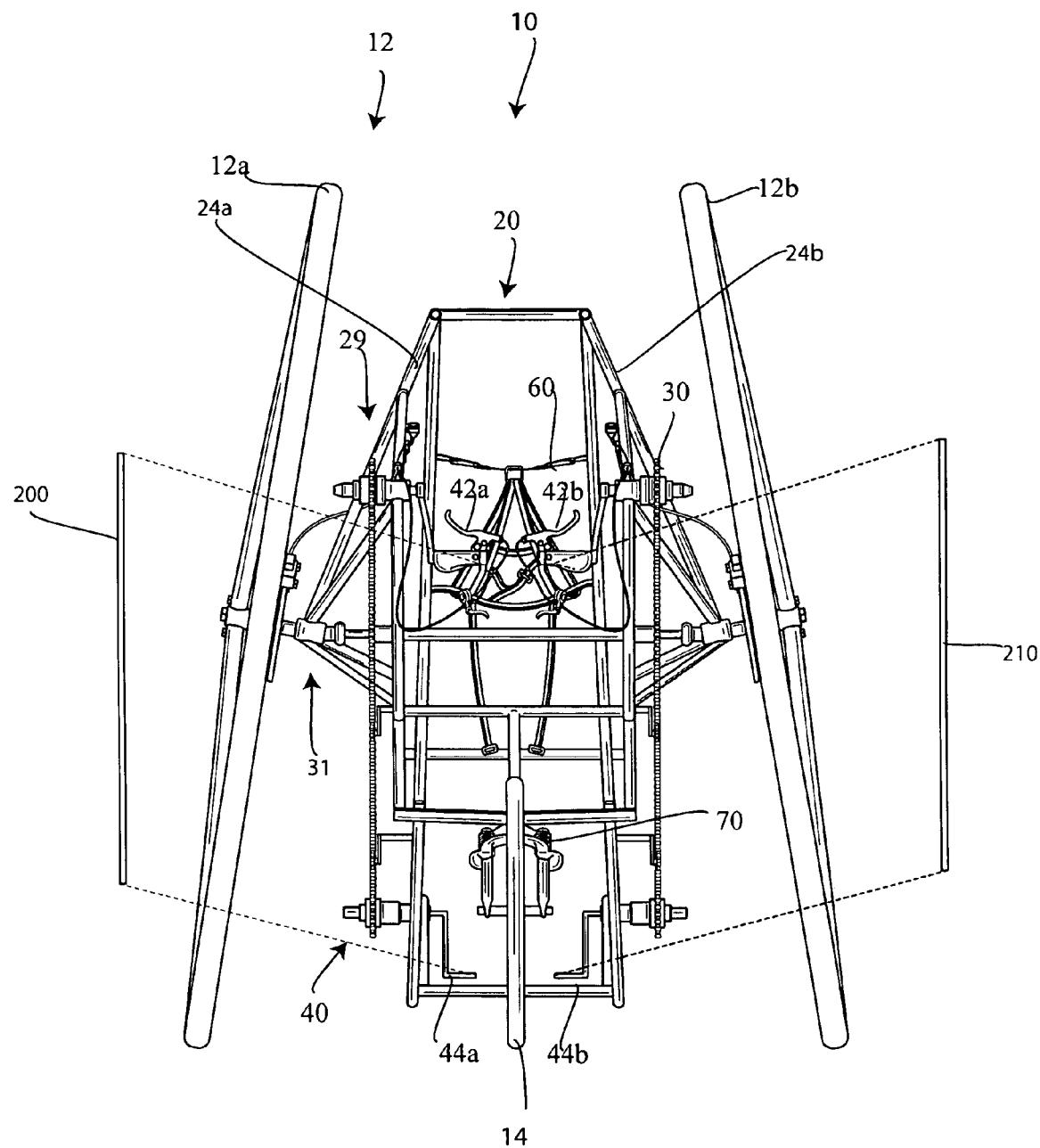
FIG. 6 is a front view of another embodiment of the invention in exploded form.

FIG. 6 shows another embodiment of the invention wherein in this embodiment, bars are used to connect the pedals, wherein these bars can be used to keep the pedals in a synchronized manner. For example bars 200 and 210 can connect to pedals or to their crank shafts to synchronize the movement of pedal 42a with the movement of pedal 42b along with the movement of pedal 44a with the movement of pedal 44b.

For example, as a person pulls down on pedal 42a, he or she simultaneously pushes down on pedal 44a. Bar 200 keeps these two pedals synchronized. In addition, at that same time pedal 42b and 44b move in an opposite upward motion so that the persons arms and legs on the opposite side of their body move in an upward manner.

In use a user would strap into harness 60 and then tighten adjuster 66 so that the harness creates a snug fit for that individual. The users arms would extend out from straps or loops 63a and 63b to pedals 42a and 42b the user would extend through the harness with his or her legs extending through straps or loops 68a and 68b such that one leg extends through loop 68a and another leg extends through loop 68b. At this point, the user is suspended off of the ground in harness 60 which is attached to sissy bar 60a forming a contoured head neck and back support at bars 126a and 126b. This user can grasp pedals 42a and 42b disposed in front of the user. The user can then place his or her feet on pedals 44a and 44b. The suspension in the harness is such that the user can either be in a substantially upright position or with a sleight lean forward. The suspended user has full use of his or her arms and legs so that the user can push down for example on pedal 44a and simultaneously pull down on pedal 42a. This causes wheel 12a to move in a substantially forward motion. If the user only drove wheel 12a, the device would move substantially in a circle.

However, at this time the user can also push up on pedal 42b while allowing pedal 44b to move up as well. Therefore one side of the person's body is moving downward while another side of the person's body is moving upward. This motion continues until the first downward moving side hits a bottom of the cycle of motion while the opposite side hits an upward side of the movement. At that point the movement reverses with pedal 42b being pulled down along with pedal 44b being pushed down while pedal 42a is being pushed up. These movements create a cycled but substantially continuous drive in wheels 12a and 12b.

As the user moves along, wheel 14 can be in a region in front of the user supporting the user from rotating entirely around these wheels. This forward lean of the user creates pressure on forward wheel 14 which is used as a support and guide wheel.

This wheel 14 can be a floater wheel, that is it can float above the ground rather than roll on the ground when the driven wheels 12a and 12b are driven. In addition this wheel 14 may provide additional support so that if the user encounters rough terrain such as rocks which create shocks this wheel 14 can provide shock absorbing capacity for the user. Therefore, shock absorbers 70 can be used to absorb these shocks while the user is moving forward. This device can thus be used to create in the user a feeling of free suspension wherein this free suspension via the harness and the associated exercise gives the user a feeling of exercising in space.

To stop this device the user can apply one or both of the hand brakes. Thus, this user can then apply one hand brake then slowly activate either one of hand brakes 46a or 46b which then through cabling 47a and 47b creates a clamping pressure on discs 53a and 53b via a caliper and brake pads 51a and 51b. The user can also control the steering from left to right by braking on either side while continuing to pedal with one wheel on one side. This allows for a tight turn radius which enables a user to essentially rotate about a circle.

FIG. 7A shows a close up side view of a connection between an axle 221 having sprockets 34a or 34b and 53a or 53b coupled to it. There is also a wheel axle connector 300 which is coupled to either wheels 12a or 12b. This view shows the connection between the axle and the wheels. With this connection a shown in FIG. 7B there is an axle receiving section disposed in connector 300 comprising a first outer section 310 and a second inner section 312. Outer section 310 has a top surface 311 which is parallel to bottom surface 313 on section 312, wherein when the wheel is positioned on its proper angle, these surfaces are substantially parallel to the ground. In addition opposite surfaces 315 on section 310 and 317 on section 312 also extend parallel to each other but these surfaces do not extend parallel to the ground.

FIG. 7C shows an embodiment 400 which includes axle 221 which has gearing 402. Gearing 402 includes teeth or ridges which mesh with sections 310 and 312. For example when gearing 402 is inserted into section 300, the top part of gearing 402 meshes with top surface 311 while the bottom part of gearing 402 meshes with bottom surface 313. This meshing on the bottom is created by gravitational forces of the rider pressing down on the axle, while the meshing on the top between gearing 402 and top surface 311 is created by the moment force of the wheel pressing down on gear 402. Thus, this gearing also keeps wheels 12a and 12b in proper positioning as well.

However, because surfaces 315 and 317 are angled away, these surfaces are free from meshing with gearing 310. The above is one example of a gearing connection between wheels 12a and 12b and axle 221. Other connections can also be made as is known in the art.

Accordingly, while a few embodiments of the present invention have been shown and described, it is to be understood that many changes and modifications may be made thereunto without departing from the spirit and scope of the invention as defined in the appended claims.

What is claimed is:

1. A cycling device comprising:
   a) a frame;
   b) a plurality of pedals wherein said plurality of pedals comprises a plurality of hand pedals and a plurality of foot pedals;
   c) a plurality of wheels coupled to said frame; and
   d) a harness coupled to said frame wherein said harness allows a user to be coupled to said frame;
   e) a plurality of crank gears;
   f) a plurality of crank shafts wherein at least one of said plurality of crank shafts is coupled to at least one crank gear and to at least one pedal wherein each of said plurality of pedals is coupled to at least one crank shaft; and
   g) at least one synchronizing shaft, for synchronizing at least one hand pedal with at least one foot pedal wherein said at least one synchronizing shaft is coupled to at least one hand pedal crank shaft and to at least one foot pedal crank shaft.

2. The cycling device as in claim 1, further comprising at least one linkage wherein said at least one linkage is for rotationally coupling at least two of said plurality of pedals together.

3. The cycling device as in claim 1, wherein at least one of said pedals is a foot pedal and at least one of said pedals is a hand pedal.

4. The cycling device as in claim 1, wherein said plurality of pedals comprises at least two foot pedals.

5. The cycling device as in claim 1, wherein said plurality of pedals comprises at least two hand pedals.

6. The cycling device as in claim 1, wherein said plurality of pedals comprises at least two foot pedals and at least two hand pedals.

7. The cycling device as in claim 1, wherein said plurality of wheels includes at least two wheels.

8. The cycling device as in claim 1, wherein said plurality of wheels includes at least three wheels.

9. The cycling device as in claim 1, wherein at least two of said plurality of wheels includes at least two wheels coupled to said frame on an angle.

10. The cycling device as in claim 1, wherein at least two of said wheels are driven wheels which are driven by said plurality of pedals.

11. The cycling device as in claim 10, wherein at least one of said plurality of wheels includes at least one non driven wheel.

12. The cycling device as in claim 11, wherein said plurality of wheels includes at least two driven wheels and at least one non-driven wheel, wherein said at least one non-driven wheel is smaller than said at least two driven wheels.

13. The device as in claim 12, further comprising at least one axle coupling said at least two driven wheels together.

14. The device as in claim 13, further comprising at least one drive crank coupled to said at least one axle.

15. The device as in claim 12, wherein said at least one linkage is in the form of a chain linking at least two of said pedals together.

16. A cycling device comprising:
a) a frame;
b) a plurality of pedals comprising a plurality of hand pedals and a plurality of foot pedals;
c) a plurality of wheels coupled to said frame; and
d) a personal holding means for holding a user in a position adjacent to said frame, said personal holding means for allowing a user to freely move its arms and legs while being supported by said personal holding means;
e) a plurality of crank gears;
f) a plurality of crank shafts wherein at least one of said plurality of crank shafts is coupled to at least one crank gear and to at least one pedal wherein each of said plurality of pedals is coupled to at least one crank shaft; and
g) at least one synchronizing shaft, for synchronizing at least one hand pedal with at least one foot pedal wherein said at least one synchronizing shaft is coupled to at least one hand pedal crank shaft and to at least one foot pedal crank shaft.

17. A cycling device comprising:
a) a frame;
b) a plurality of pedals comprising a plurality of hand pedals and a plurality of foot pedals;
c) a plurality of wheels coupled to said frame wherein said plurality of wheels comprises:
  i) at least one set of wheels comprising at least two driven wheels wherein said at least two driven wheels are driven by a user pushing on at least one of said plurality of pedals;
  ii) at least one additional wheel coupled to said frame;
d) a plurality of crank gears;
e) a plurality of crank shafts wherein at least one of said plurality of crank shafts is coupled to at least one crank gear and to at least one pedal wherein each of said plurality of pedals is coupled to at least one crank shaft; and
f) at least one synchronizing shaft, for synchronizing at least one hand pedal with at least one foot pedal wherein said at least one synchronizing shaft is coupled to at least one hand pedal crank shaft and to at least one foot pedal crank shaft.

18. The device as in claim 17, wherein said at least one additional wheel is a non driven wheel.

* * * * *